(12) United States Patent
Michaelis et al.

(10) Patent No.: US 8,717,744 B2
(45) Date of Patent: May 6, 2014

(54) FUSE COVER

(75) Inventors: Gary Paul Michaelis, Oakville, CT (US); Seth Adam Cutler, Bridgeport, CT (US); Sachin Tulsidas Thakkar, Hyderabad (IN)

(73) Assignee: General Electric Company, Schenectady, NY (US)

( * ) Notice: Subject to any disclaimer, the term of this patent is extended or adjusted under 35 U.S.C. 154(b) by 233 days.

(21) Appl. No.: 13/280,587

(22) Filed: Oct. 25, 2011

(65) Prior Publication Data

US 2013/0100589 A1    Apr. 25, 2013

(51) Int. Cl.
*H02B 1/04* (2006.01)
*H02B 1/26* (2006.01)

(52) U.S. Cl.
USPC ............ 361/642; 361/641; 361/643; 361/649

(58) Field of Classification Search
None
See application file for complete search history.

(56) References Cited

U.S. PATENT DOCUMENTS

| | | | | |
|---|---|---|---|---|
| 2,275,754 | A * | 3/1942 | Grieder | 361/661 |
| 4,355,269 | A * | 10/1982 | Burton et al. | 318/436 |
| 5,369,548 | A * | 11/1994 | Combs | 361/643 |
| 5,670,928 | A * | 9/1997 | Cheng et al. | 337/188 |
| 5,734,207 | A | 3/1998 | LeCourt | |
| 5,784,249 | A * | 7/1998 | Pouliot | 361/622 |
| 5,923,527 | A * | 7/1999 | Ricciuti, Jr. | 361/641 |
| 6,144,001 | A * | 11/2000 | Green et al. | 200/304 |
| 6,326,776 | B1 * | 12/2001 | Yoshiuchi et al. | 324/156 |
| 6,717,293 | B1 * | 4/2004 | Irvine et al. | 307/326 |
| 6,724,590 | B1 * | 4/2004 | Radosavljevic et al. | 361/42 |
| 6,732,352 | B2 * | 5/2004 | Lindsay et al. | 324/755.01 |
| 6,992,256 | B1 | 1/2006 | Wiley et al. | |
| 7,136,278 | B2 * | 11/2006 | Allen | 361/647 |
| 7,567,430 | B2 * | 7/2009 | Ewing et al. | 361/623 |
| 7,816,602 | B2 * | 10/2010 | Landry et al. | 174/50 |
| 7,824,191 | B1 | 11/2010 | Browder | |
| 8,089,747 | B2 * | 1/2012 | Storck et al. | 361/641 |
| 8,310,818 | B1 * | 11/2012 | Czarnecki | 361/622 |
| 2006/0012350 | A1 | 1/2006 | Fey | |
| 2010/0043863 | A1 | 2/2010 | Wudu et al. | |
| 2010/0101854 | A1 * | 4/2010 | Wallaert et al. | 174/502 |
| 2010/0110616 | A1 * | 5/2010 | Edel | 361/642 |

OTHER PUBLICATIONS

Clearwater Tech, "ABB solutions for photovoltaics Protection and other modular devices," pp. 1-18.
Cooper Bussmann, "Photovoltaic (PV) Systems," 2005, pp. 1-2.
Moeller GmbH, "Protecting and Disconnecting in Photovoltaic Systems," pp. 1-12.
Oez s.r.o., "Protective and switching devices of photovoltaic sources," 2010, pp. 1-20.
SIBA, "Professional protection for professional photovoltaic systems SIBA fuses for solar energy systems," pp. 1-8.

* cited by examiner

*Primary Examiner* — Boris Chervinsky
(74) *Attorney, Agent, or Firm* — Cantor Colburn LLP (57) ABSTRACT

A connection apparatus includes a housing portion comprising a back panel and side panels, the back panel and side panels partially defining a cavity having an access orifice, the side panels partially defining an entry area to the access orifice, a fuse holder assembly disposed in the cavity, and a cover disposed in the cavity between a portion of the fuse holder assembly and the entry area to the access orifice, the cover obscures a portion of the fuse holder assembly.

15 Claims, 9 Drawing Sheets

FUSE COVER

BACKGROUND OF THE INVENTION

The subject matter disclosed herein relates to fuses, and particularly to a switch box arrangement that includes fuses.

Traditional alternating current (AC) switch boxes often include an array of switches and fuses that correspond to each phase of a multi-phase electrical distribution system. The switches are arranged to disconnect the line side of the fuses from the incoming voltage of a respective phase.

The switch boxes often include an external lever that is mechanically linked to the switches such that actuating the external lever opens and closes the switches. In operation, a technician operates the external lever to open the switches, thereby isolating the fuses prior to opening an access panel or door that exposes the fuse and switches for maintenance or troubleshooting.

The electrical connection between the fuses and components that may be connected to the fuses may result in a "back feeding" state where a voltage may be present at the fuse even if the fuse is partially isolated from the system with a switch. Thus, prior to accessing the fuse during installation, maintenance, or troubleshooting, a technician should determine whether a voltage is present at the fuse. If a voltage is present at the fuse, the technician should not access the fuse until the source of the voltage is isolated from the fuse.

Previous examples of switch boxes included labels that would remind a technician to test the fuses with a volt meter to ensure that there is no voltage present at the fuse prior to accessing the fuse.

BRIEF DESCRIPTION OF THE INVENTION

According to one aspect of the invention a connection apparatus includes a housing portion comprising a back panel and side panels, the back panel and side panels partially defining a cavity having an access orifice, the side panels partially defining an entry area to the access orifice, a fuse holder assembly disposed in the cavity, and a cover disposed in the cavity between a portion of the fuse holder assembly and the entry area to the access orifice, the cover obscures a portion of the fuse holder assembly.

According to another aspect of the invention, a switch apparatus includes a housing portion comprising a back panel and side panels, the back panel and side panels partially defining a cavity and an access orifice, a switch disposed in the cavity, a fuse holder assembly disposed in the cavity, the fuse holder assembly electrically connected to the switch, and a cover disposed in the cavity between a portion of the fuse holder assembly and the access orifice, the cover obscures a portion of the fuse holder assembly.

According to yet another aspect of the invention, a cover includes a front cover panel portion including a non-conductive material, a first side cover panel portion connected to the front cover panel portion and arranged substantially perpendicular to the front cover panel portion, a second side cover panel portion connected to the front cover panel portion and arranged substantially perpendicular to the front cover panel portion, a first extension portion connected to the first side cover panel portion and arranged substantially parallel to the front cover panel portion, a second extension portion connected to the second side cover panel portion and arranged substantially parallel to the front cover panel portion, and a probe orifice arranged in the front cover panel portion.

According to yet another aspect of the invention, a system includes a power source, and a connection apparatus comprising a housing portion comprising a back panel and side panels, the back panel and side panels partially defining a cavity having an access orifice, the side panels partially defining an entry area to the access orifice, a fuse holder assembly disposed in the cavity, the fuse holder assembly electrically connected to the power source, and a cover disposed in the cavity between a portion of the fuse holder assembly and the entry area to the access orifice, the cover obscures a portion of the fuse holder assembly.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
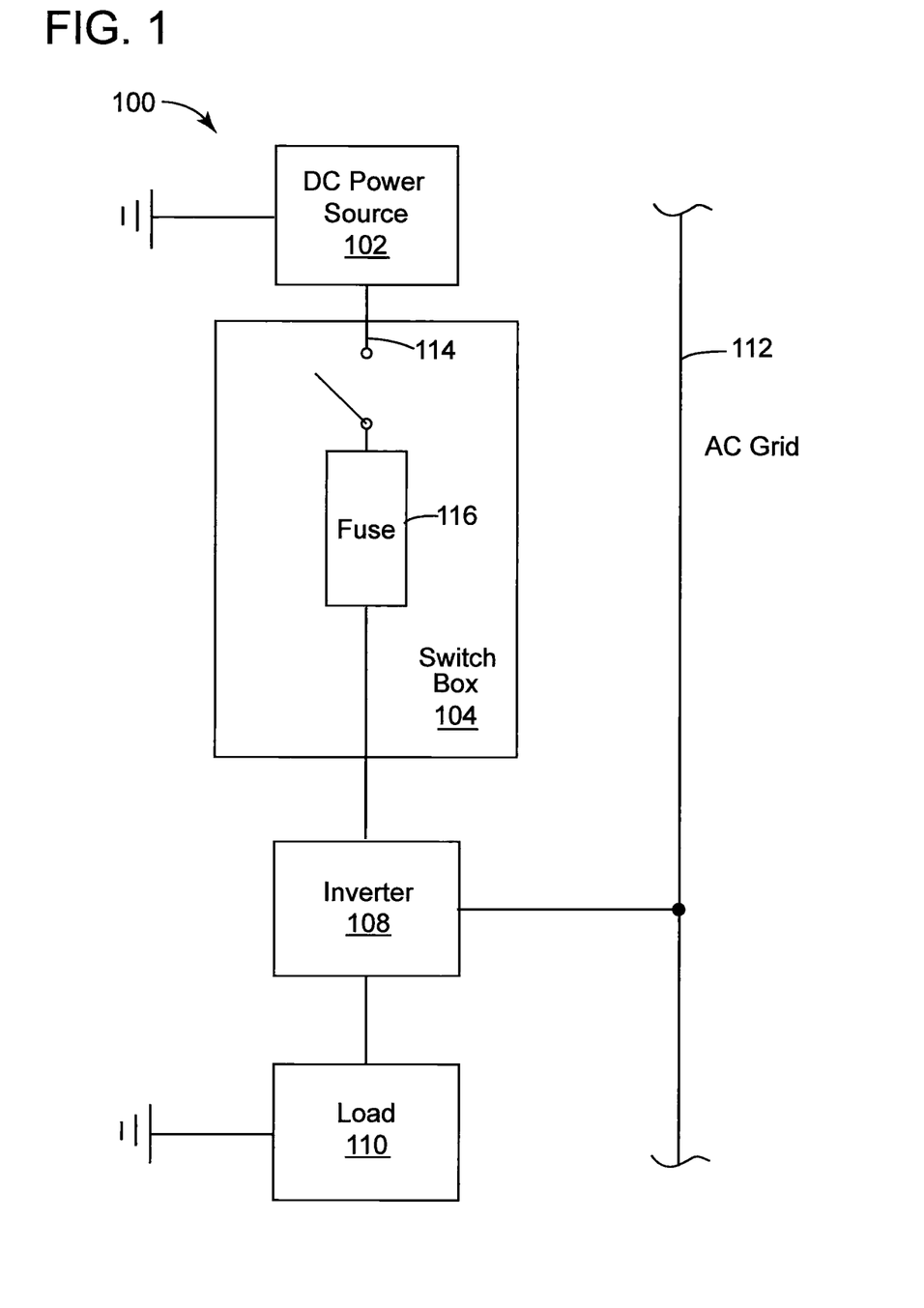
FIG. 1 illustrates a block diagram of an exemplary embodiment of an electrical system, in accordance with an embodiment of the invention.

FIG. 1 illustrates a one-line block diagram of an exemplary embodiment of an electrical system (system) 100. The system 100 includes a direct current (DC) power source 102 that may include, for example, an array of solar cells, a wind turbine, or other type of generator or power source. A switch box 104 is electrically connected to the DC power source 102 and an inverter 108. The inverter 108 is operative to invert DC power into AC power. The inverter 108 is electrically connected to a load 110 and an AC grid 112. While the electrical system 100 is depicted in FIG. 1 as a one-line block diagram, it will be appreciated by one skilled in the art that such a depiction also represents a multi-phase electrical distribution system, such as a three-phase or three-phase with switching neutral electrical system, for example.

The switch box 104 includes a fuse 116 that may include any type of fuse such as, for example, a photovoltaic (PV) fuse that is electrically connected to the DC power source 102 and the inverter 108. The switch box 104 includes a switch 114 that is electrically connected to the fuse 116 and the DC power source 102. The arrangement of the switch 114 allows the fuse 116 to be electrically isolated from the DC power source 102 when the switch 114 is in an open position or state.

The electrical connection between the inverter 108 and the AC grid 112, and in some instances, the connection between the inverter and the load 110, may result in a "back feeding" state where a voltage may be present at the fuse 116 even if the fuse 116 is isolated from the DC power source 102 (i.e., the switch 114 is in an open position or state). Thus, prior to accessing the fuse 116 during installation, maintenance, or troubleshooting, a technician should determine whether a voltage is present at the fuse 116. If a voltage is present at the fuse, the technician should not access the fuse 116 until the source of the voltage is isolated from the fuse.

The embodiments described below include an obstructive member between the fuse 116 and an access opening of the switch box 104 that will allow a technician to test the fuse 116 to determine whether voltage is present while the obstructive member remains in position. In operation, once the technician has tested the fuse 116 and ensured that no voltage is present at the fuse 116, the technician may remove or reposition the obstructive member to gain physical access to the fuse 116.

Figure 2:
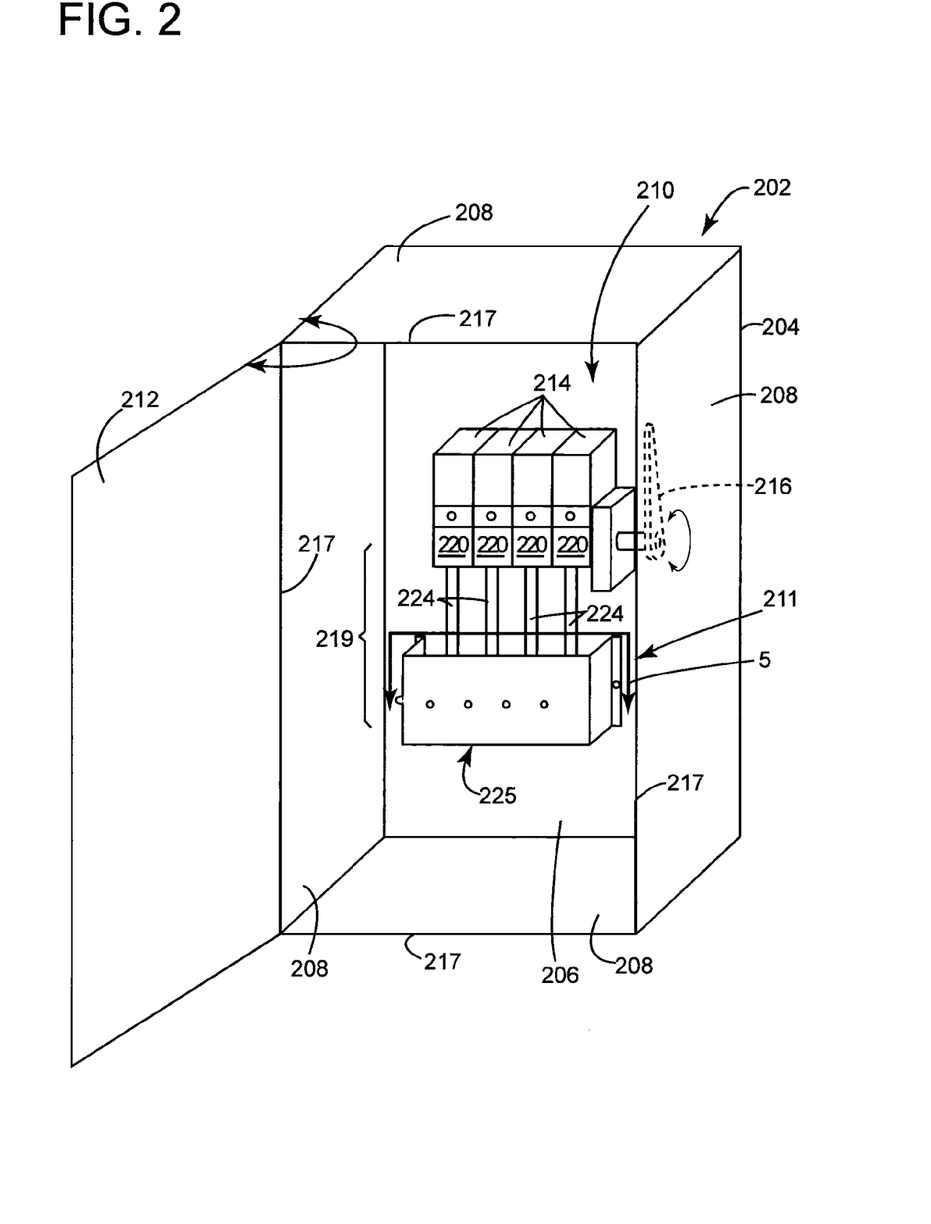
FIG. 2 illustrates an exemplary embodiment of a switch box, in accordance with an embodiment of the invention.

In this regard, FIG. 2 illustrates an exemplary embodiment of a switch box (connection box) 202. The switch box 202 is arranged to be used in a multi-phase power system. Though the switch box 202 of the illustrated embodiment is arranged to be used in a three-phase power system, alternate embodiments may include similar arrangements that may be used in, for example, a single-phase power system or a multi-phase power system having any number of phases.

The switch box 202 includes a housing portion 204 having a rear panel 206, and side panels 208 that define a cavity 210 having an access orifice 211 defined in an embodiment by exposed edges 217 of the side panels 208, the housing portion 204 includes a front panel 212 that encloses the cavity 210 and the access orifice 211 when arranged in a closed position. The front panel 212 may be secured to the side panels 208 of the housing portion with, for example, fasteners, a hinge arrangement, a combination of a hinge arrangement and fasteners, or any suitable combination of hooks, clasps, or clips. Switches 214 are arranged in the cavity 210. The switches 214 are connected to an actuating lever 216 with a mechanical linkage arrangement such that the movement of the actuating lever 216 changes the position or state of the switches 214. Each of the switches 214 includes a terminal that may be connected to an electrical cable or line. The switches 214 are electrically connected to corresponding fuse holder assemblies 219. The each of the fuse holder assemblies 219 includes a first fuse holder portion 220 and a second fuse holder portion 222. The first fuse holder portion 220 secures a first end of a fuse 224 and is electrically connected to a corresponding switch 214. The second fuse holder portion 222 secures a second end of the fuse 224 and is electrically connected to a terminal that may be electrically connected to an electrical cable or line. An electrical path is defined by the terminals of a switch 214, the switch 214 contacts, the first fuse holder portion 220, the fuse 224, the second fuse holder portion 222, and terminals of the second fuse holder portion 222.

As discussed above, in operation, a voltage may be present in the fuses 224 and the fuse holder assemblies 219 during a back feeding state even if the switches 214 are in an open position or state. It is desirable to encourage a technician to determine whether a voltage is present in the fuses 224 and the fuse holder assemblies 219 prior to performing installation, maintenance, or troubleshooting tasks. FIG. 2 illustrates a partially transparent view of an exemplary embodiment of a cover 225 that is arranged in the cavity 210 between the access orifice 211 and the second fuse holder portions 222. In the illustrated embodiment, the cover 225 is fabricated from a non-conductive or insulating material such as, for example, a plastic, nylon, composite, or other type of non-conductive material. The cover 225 of the illustrated embodiment is fabricated from a single sheet of semi-rigid material however, alternate embodiments are not limited to being fabricated from a single sheet of material, and may be fabricated and assembled from any number or combination of parts and components that many include, for example, rigid, flexible, or semi-rigid materials.

Figure 3:
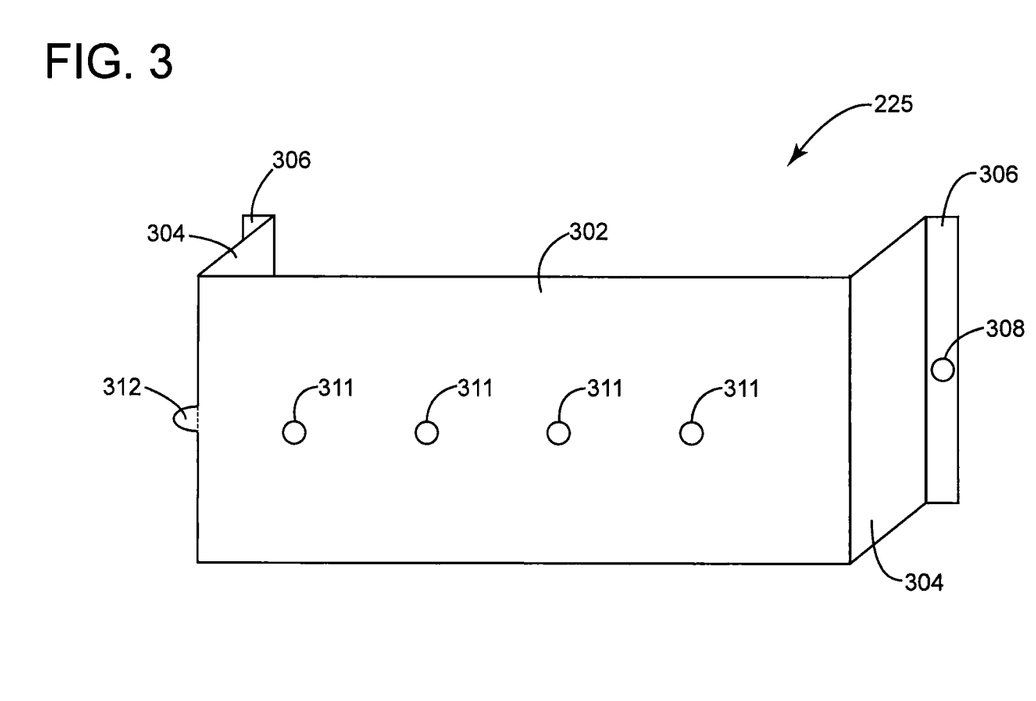
FIG. 3 illustrates a perspective view of an exemplary embodiment of the cover of FIG. 2.
Figure 4:
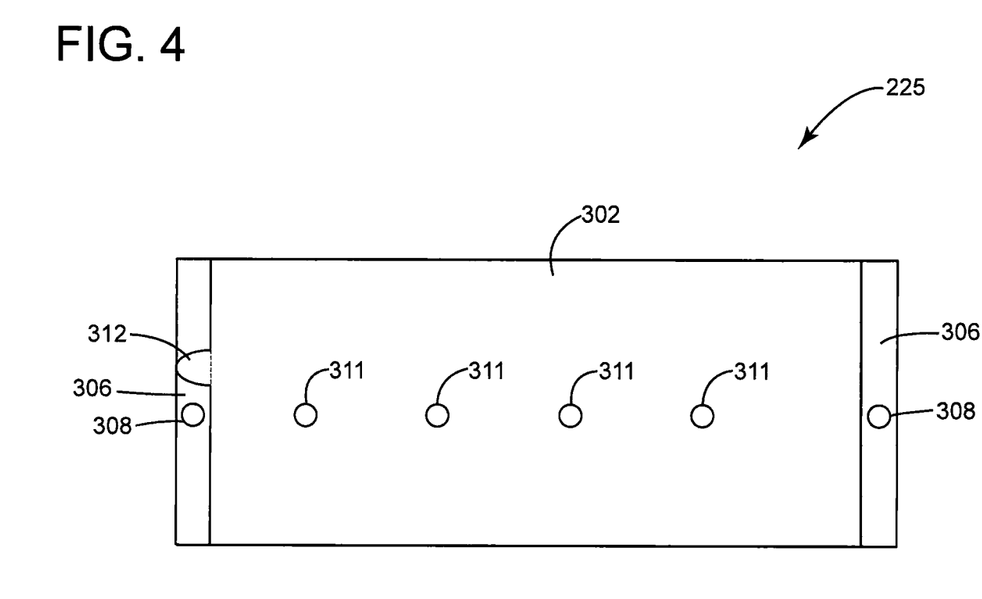
FIG. 4 illustrates a front view of the exemplary embodiment of the cover of FIG. 3.

FIG. 3 illustrates a perspective view of an exemplary embodiment of the cover 225. The cover 225 includes a front cover panel portion 302 and side cover panel portions 304 that are connected to the front cover panel portion 302. The side cover panel portions 304 are connected to extension portions 306. In the illustrated embodiment, the extension portions 306 include at least one orifice 308 that is operative to receive a fastener such as, for example, a bolt or a screw (not shown). The front cover panel portion 302 includes probe orifices 311 that are sized and shaped to allow a voltage or other type of testing probe to be inserted through the probe orifices 311. The probe orifices 311 of the illustrated embodiment are formed in a circular shape and are sized such that a testing probe may pass through one of the probe orifices 311, but other tools that are larger than the diameter of the probe orifices 311 or parts of a human body such as, a finger may not pass through the probe orifices 311. Thus, the front cover panel portion 302 partially obscures portions of the fuse holder assemblies 219 when viewed by a technician via the access orifice 211 (of FIG. 2). FIG. 4 illustrates a front view of the exemplary embodiment of the cover 225 of FIG. 3 as described above.

Figure 5:
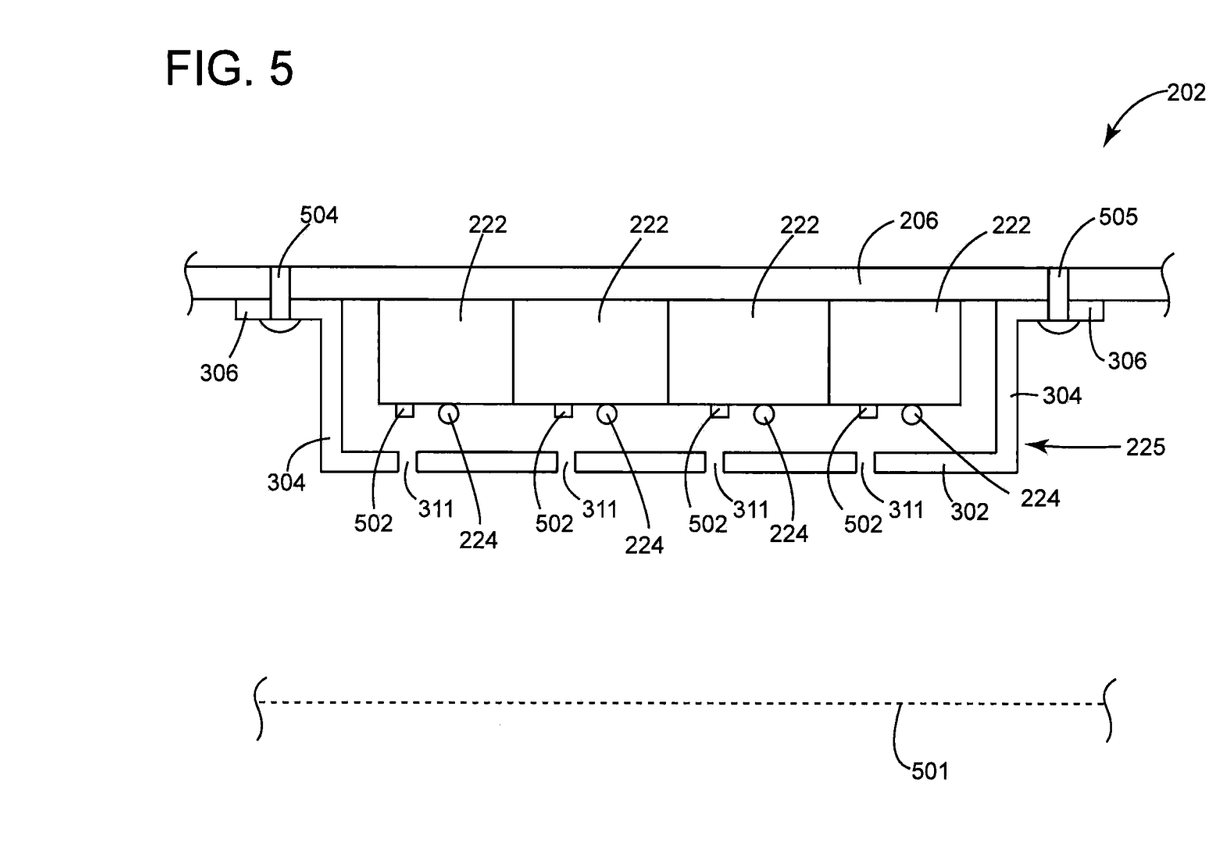
FIG. 5 illustrates a top partially cut-away view of the cover along the line 5 of FIG. 2.

FIG. 5 illustrates a top partially cut-away view of the cover 225 along the line 5 (of FIG. 2). The cover 225 is secured to the rear panel 206 of the switch box 202 with fasteners 504 and 505 that pass through the orifices 308 (of FIG. 3). The fasteners 504 and 505 may be similar or dissimilar. In one embodiment, the fastener 505 includes a "one-way" screw head that makes removal of the fastener 505 difficult without special tools, while the fastener 504 includes a traditional screw head such as, for example, a slotted screw head. Thus, a technician is discouraged from removing the fastener 505 and is encouraged to remove the fastener 504. Such an arrangement helps to ensure that the cover 225 may not be completely removed by a technician and discarded. The probe orifices 311 are arranged to align with corresponding test contact points 502 on the second fuse holder portions 222 such that each of the probe orifices 311 and the corresponding test contact points 502 define lines substantially normal to the front cover panel portion. The test contact points 502 are electrically connected to the fuses 214 and the terminals of the second fuse holder portions 222. The test contact points 502 may include any conductive portion of the second fuse holder portions 222 that are electrically connected to the terminals of the second fuse holder portions 222. The front cover panel portion 302 is arranged such that the planar surfaces of the front cover panel portion 302 are substantially parallel to the planar surfaces of the rear panel 206. In the illustrated embodiment, the planar surfaces of the side cover panel portions 304 are substantially perpendicular to the planar surfaces of the front cover panel portion 302 and the planar surfaces of the extension portions 306 are substantially parallel to the rear panel 206. In alternate embodiments, the planar surfaces of the cover 225 may be arranged in any suitable alternative arrangement relative to each other, or the switch box 202, and are not limited to the arrangements described above. The line 501 illustrates a plane partially defined by the by exposed edges 217 of the side panels 218 (of FIG. 2), the cover 225 is disposed between the plane partially defined by the by exposed edges 217 of the side panels 218 and the second fuse holder portions 222.

Figure 6:
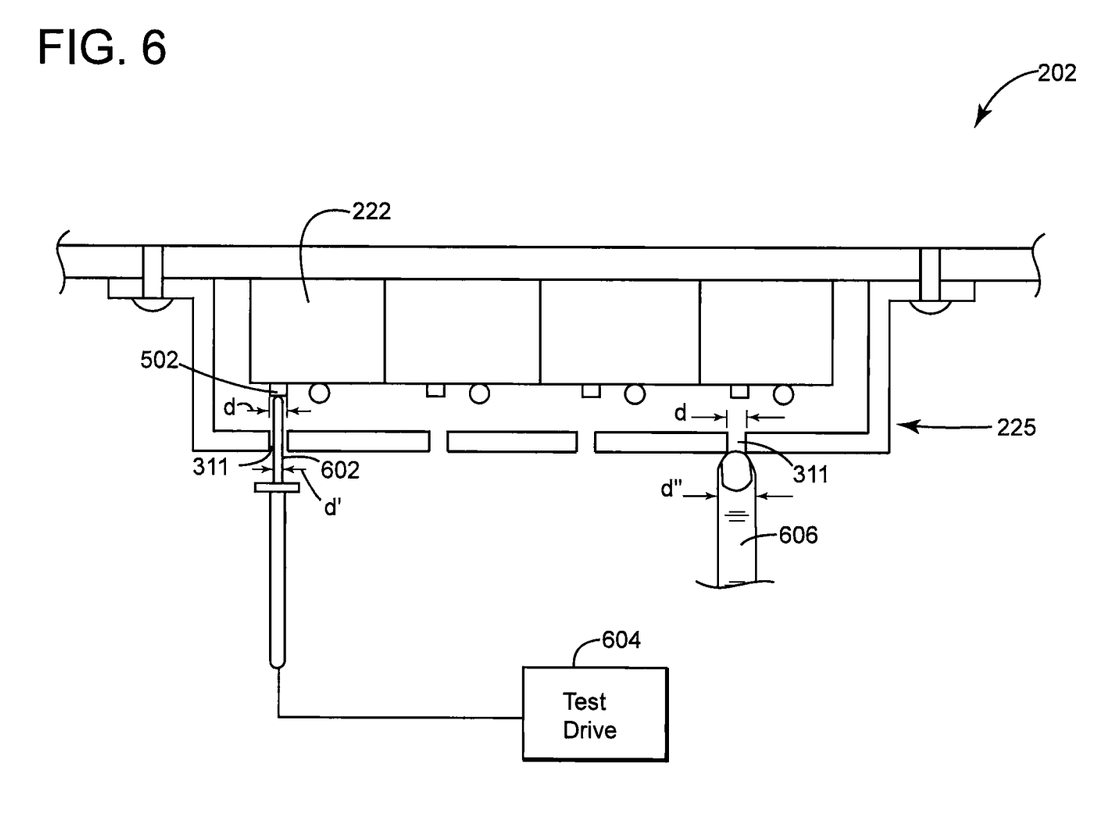
FIG. 6 illustrates another top partially cut-away view of the cover along the line 5 of FIG. 2.

FIG. 6 illustrates another top partially cut-away view of the cover 225 along the line 5 (of FIG. 2). FIG. 6 illustrates the use of a test probe 602 that is electrically connected to a test device 604, such as, for example, a voltmeter device. The test probe 602 is shown passing through a probe orifice 311 of the cover 225 to contact a corresponding test contact point 502 of the second fuse holder portions 222. The diameter (d) of the probe orifice 311 is between about 2.5 mm to 4 mm and greater than the diameter (d') of the test probe 602 such that the test probe 602 may pass through the probe orifice 311. FIG. 6 also illustrates a finger 606 that has been placed adjacent to a probe orifice 311, the diameter (d) is less than the approximate diameter (d") of the finger 606, thus preventing the finger 606 or other objects from passing through the probe orifice 311 and contacting conductive portions of the second fuse holder portions 222.

Figure 7:
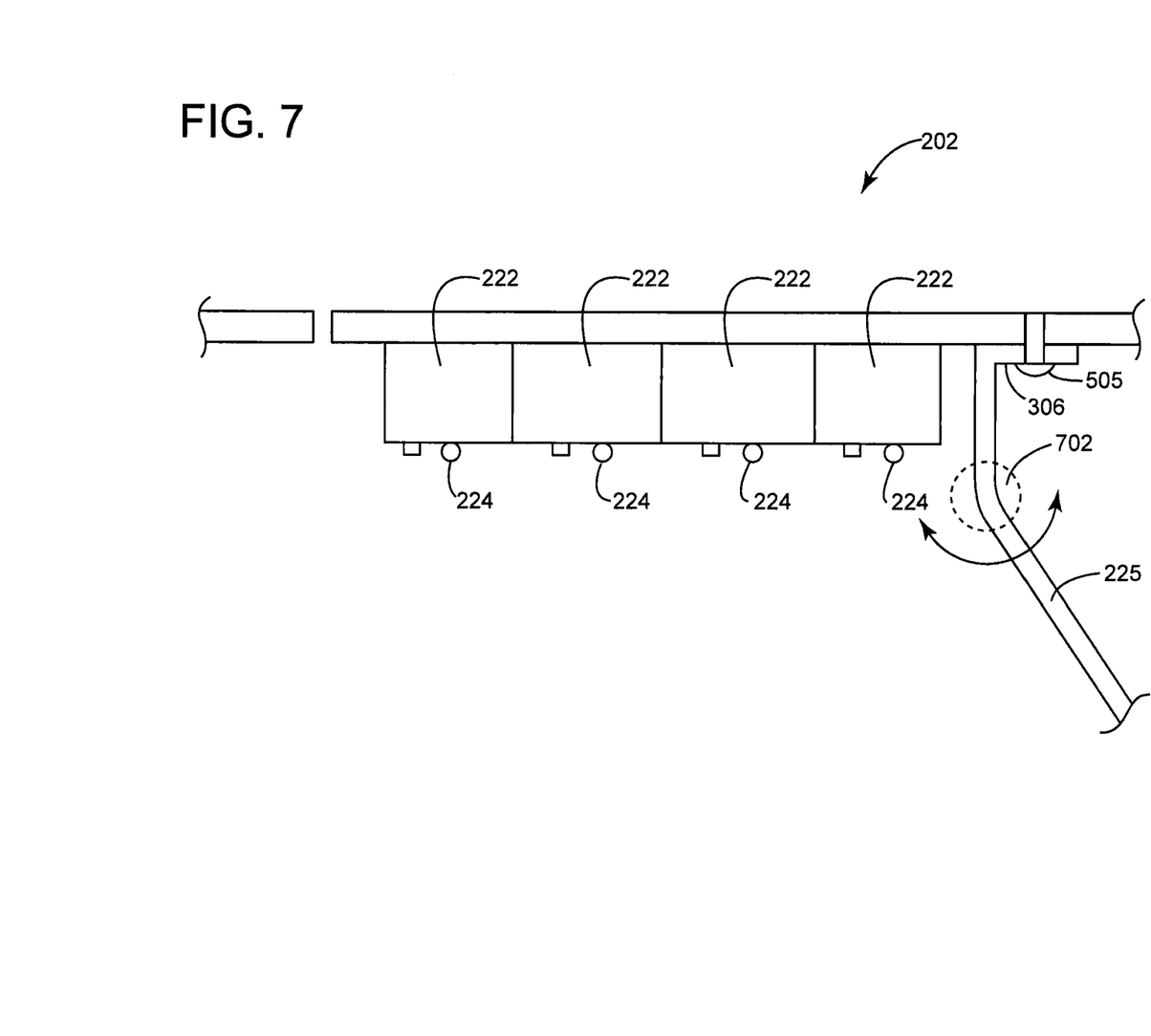
FIG. 7 illustrates a top view of the cover along the line 5 of FIG. 2.

FIG. 7 illustrates a top view of the cover 225 along the line 5 (of FIG. 2). In FIG. 7, the fastener 504 (of FIG. 5) has been removed, and the cover 225 has been moved to provide access to the second fuse holder portions 222 and the fuses 224. In the illustrated embodiment, the cover 225 has been deformed to flex about the region 702. The region 702 of the cover 225 may include a crease or scored portion to reduce the resistance to the deformation. The fastener 505 secures the extension portion 306 of the cover 225 to the rear panel 206 of the switch box 202.

Figure 8:
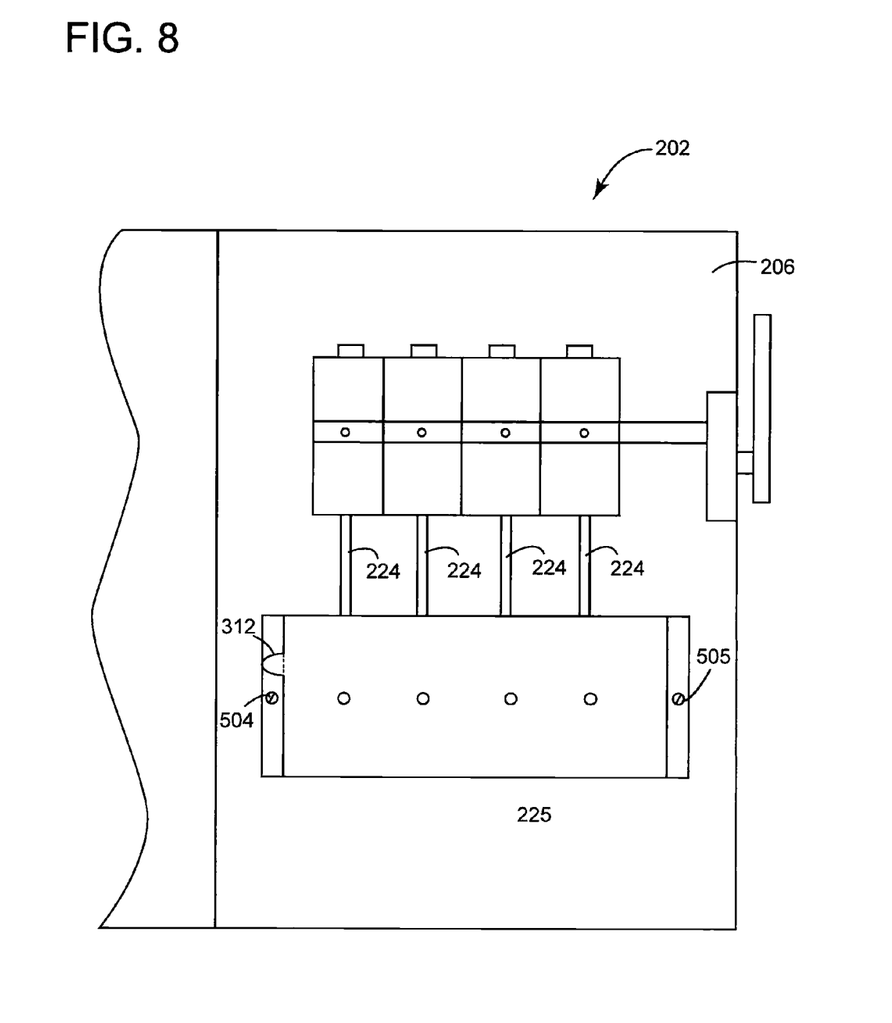
FIG. 8 illustrates a front view of the switch box with the cover arranged in a closed position, in accordance with an embodiment of the invention.

FIG. 8 illustrates a front view of the switch box 202 with the cover 225 arranged in a closed position. The cover 225 obscures portions of the second fuse holder portions 222 (of FIG. 2) and the fuses 224. The cover 225 is secured to the rear panel 206 of the switch box 202 with the fasteners 504 and 505, however any number of fasteners or other fastening means such as, for example, clips, pins, brackets or tabs may be used in alternate embodiments.

Figure 9:
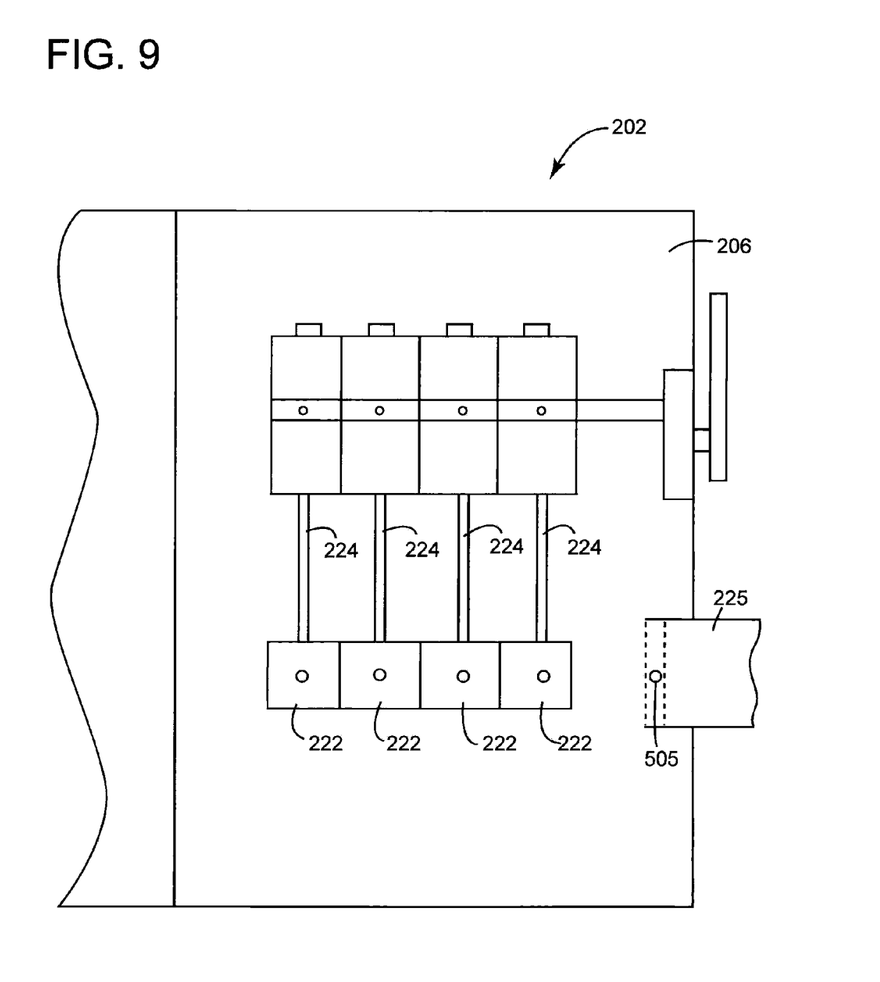
FIG. 9 illustrates a front view of the switch box with the cover arranged in an open position, in accordance with an embodiment of the invention.

FIG. 9 illustrates a front view of the switch box 202 with the cover 225 arranged in an open position. The fastener 504 has been removed, and the cover 225 has been positioned to expose and to allow access to the second fuse holder portions 222 and the fuses 224.

Though the embodiments of the switch box 202 (of FIG. 2) include switches 214, in alternate embodiments the switch box 202 may be a connection box that does not include the switches 214, but includes the fuse holder assemblies 219 and the cover 225 arranged in a similar manner as discussed above.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A connection apparatus comprising:
a housing portion comprising a back panel and side panels, the back panel and side panels partially defining a cavity having an access orifice, the side panels partially defining an entry area to the access orifice;
a fuse holder assembly disposed in the cavity and comprising a test contact portion;
a cover disposed in the cavity between a portion of the fuse holder assembly and the entry area to the access orifice, the cover configured to obscure a portion of the fuse holder assembly, the cover comprising:
a front cover panel portion having a planar surface arranged substantially parallel to a planar surface of the back panel;
a first side cover panel portion connected to the front cover panel portion and to a first extension portion connected to the back panel, the first side cover panel portion having a planar surface arranged substantially perpendicular to the planar surface of the front cover panel portion, the first extension portion having a planar surface arranged substantially parallel to the back panel; and
a second side cover panel portion connected to the front cover panel portion and to a second extension portion connected to the back panel, the second side cover panel portion having a planar surface arranged substantially perpendicular to the planar surface of the front cover panel portion, the second extension portion having a planar surface arranged substantially parallel to the back panel; and
a probe orifice extending through the cover and arranged in alignment with the test contact portion.

2. The apparatus of claim 1, wherein the housing portion further comprises a front panel connected to the side panels, wherein the cover is disposed between the fuse holder assembly and the front panel.

3. The apparatus of claim 1, further comprising a switch disposed in the cavity, the switch electrically connected to the fuse holder assembly.

4. The apparatus of claim 1, wherein the cover is connected to the back panel.

5. The apparatus of claim 1, wherein the cover is connected to the back panel with a fastener.

6. The apparatus of claim 1, wherein the probe orifice has a diameter between approximately 2.5 mm and 4 mm.

7. The apparatus of claim 1, wherein the cover comprises a non-conductive material.

8. The apparatus of claim 1, wherein the cover consists of a non-conductive material.

9. The apparatus of claim 1, further comprising a switch electrically connected to the fuse holder assembly.

10. A switch apparatus comprising:
a housing portion comprising a back panel and side panels, the back panel and side panels partially defining a cavity and an access orifice;
a switch disposed in the cavity;
a fuse holder assembly disposed in the cavity, the fuse holder assembly electrically connected to the switch and comprising a test contact portion;
a cover disposed in the cavity between a portion of the fuse holder assembly and the access orifice, the cover configured to obscure a portion of the fuse holder assembly, the cover comprising:
a front cover panel portion having a planar surface arranged substantially parallel to a planar surface of the back panel;
a first side cover panel portion connected to the front cover panel portion and to a first extension portion connected to the back panel, the first side cover panel portion having a planar surface arranged substantially perpendicular to the planar surface of the front cover panel portion, the first extension portion having a planar surface arranged substantially parallel to the back panel; and a second side cover panel portion connected to the front cover panel portion and to a second extension portion connected to the back panel, the second side cover panel portion having a planar surface arranged substantially perpendicular to the planar surface of the front cover panel portion, the second extension portion having a planar surface arranged substantially parallel to the back panel; and a probe orifice extending through the cover and arranged in alignment with the test contact portion.

11. The apparatus of claim 10, wherein the housing portion further comprises a front panel connected to the side panels, wherein the cover is disposed between the fuse holder assembly and the front panel.

12. A cover comprising:

a front cover panel portion including a non-conductive material;

a first side cover panel portion connected to the front cover panel portion and arranged substantially perpendicular to the front cover panel portion;

a second side cover panel portion connected to the front cover panel portion and arranged substantially perpendicular to the front cover panel portion;

a first extension portion connected to the first side cover panel portion and arranged substantially parallel to the front cover panel portion;

a second extension portion connected to the second side cover panel portion and arranged substantially parallel to the front cover panel portion; and a probe orifice arranged in the front cover panel portion.

13. A system comprising:

a power source; and a connection apparatus comprising:

a housing portion comprising a back panel and side panels, the back panel and side panels partially defining a cavity having an access orifice, the side panels partially defining an entry area to the access orifice;

a fuse holder assembly disposed in the cavity, the fuse holder assembly electrically connected to the power source and comprising a test contact portion;

a cover disposed in the cavity between a portion of the fuse holder assembly and the entry area to the access orifice, the cover configured to obscure a portion of the fuse holder assembly, the cover comprising:

a front cover panel portion having a planar surface arranged substantially parallel to a planar surface of the back panel;

a first side cover panel portion connected to the front cover panel portion and to a first extension portion connected to the back panel, the first side cover panel portion having a planar surface arranged substantially perpendicular to the planar surface of the front cover panel portion, the first extension portion having a planar surface arranged substantially parallel to the back panel; and a second side cover panel portion connected to the front cover panel portion and to a second extension portion connected to the back panel, the second side cover panel portion having a planar surface arranged substantially perpendicular to the planar surface of the front cover panel portion, the second extension portion having a planar surface arranged substantially parallel to the back panel; and a probe orifice extending through the cover and arranged in alignment with the test contact portion.

14. The apparatus of claim 13, wherein the housing portion further comprises a front panel connected to the side panels, wherein the cover is disposed between the fuse holder assembly and the front panel.

15. The apparatus of claim 13, further comprising a switch disposed in the cavity, the switch electrically connected to the fuse holder assembly and the power source.

* * * * *